M. JOHNSON.

Assignor, by mesne assignments, to C. LaDow.

Rotary-Cultivator.

No. 8,222. Reissued May 7, 1878.

WITNESSES

E. H. Bates

Eugene Adamson

INVENTOR

Moses Johnson by

W. H. Babcock

ATTORNEY

N. PETERS, PHOTO-LITHOGRAPHER, WASHINGTON, D. C.

UNITED STATES PATENT OFFICE.

MOSES JOHNSON, OF LOCKPORT, NEW YORK, ASSIGNOR, BY MESNE ASSIGNMENTS, TO CHARLES LA DOW.

IMPROVEMENT IN ROTARY CULTIVATORS.

Specification forming part of Letters Patent No. 93,307, dated August 3, 1869; Reissue No. 8,222, dated May 7, 1878; application filed April 27, 1878.

*To all whom it may concern:*

Be it known that I, MOSES JOHNSON, of the city of Lockport, in the county of Niagara and State of New York, formerly of Three Rivers, Michigan, have invented certain new and useful improvements, consisting of Potato-Digger and Cultivator Combined, and on which Letters Patent were granted to me August 3, 1869; and I do hereby declare that the following is a full, clear, and exact description thereof, which will enable others skilled in the art to which it appertains to make and use the same, reference being had to the accompanying drawings, and to letters of reference marked thereon, which form a part of this specification.

This invention relates to that class of cultivators which employ rotating disks for cutting the earth.

The nature of said invention consists, first, in combining, with a concavo-convex cutting-disk, a pendent scraper, which enters the hollow of said disk; secondly, in providing such disk and scraper with adjusting devices, for lessening or increasing the distances between them; thirdly, in combining, with concavo-convex cutting-disks, pendent scrapers, attached to their supports; fourthly, in the combination of a revolving axle with a concavo-convex disk, and clamping-nuts working on screw-threads, so as to follow said disk and lighten it; fifthly, in the combination of a draft-frame with two revolving axles attached thereto, and having concavo-convex disks mounted on and firmly clamped to said axles by adjustable nuts; sixthly, in the combination of a draft-tongue, cross-bar, and revolving disks attached to said bar, said disks being adjustable toward or from each other, and arranged to straddle a row of plants and turn the earth either toward or from the row, as desired; finally, in arranging said pendent scrapers so that they will cut or shave the earth from the disks, and in other improvements, hereinafter set forth.

Figure 1:
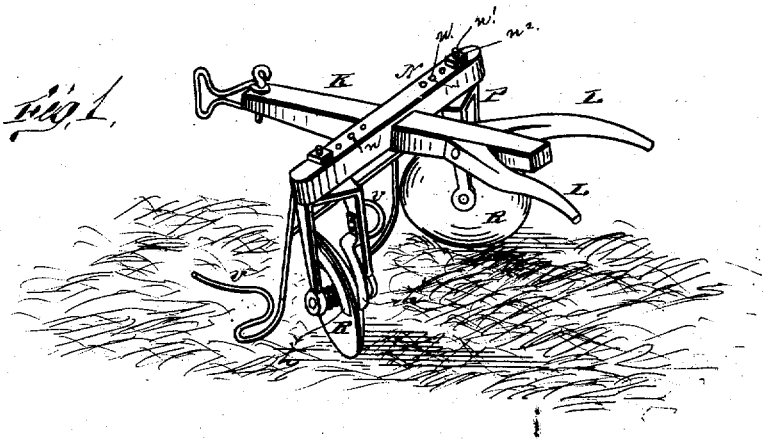
Figure 2:
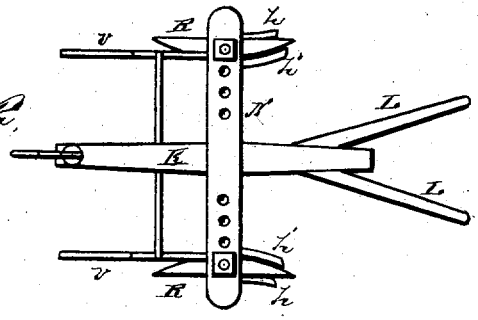
Figure 3:
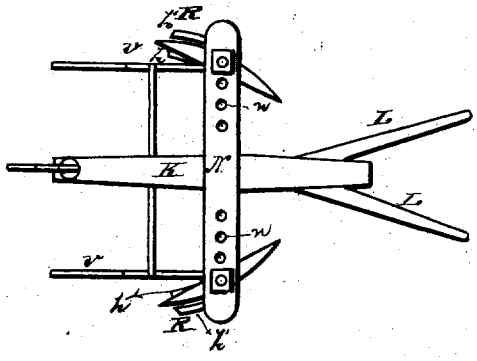
Figure 4:
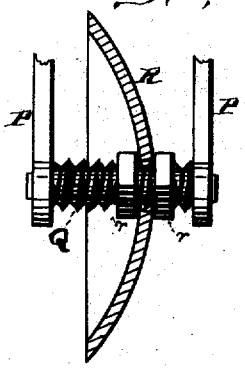

In the accompanying drawings, Figure 1 represents a perspective view of my improved cultivator, the disks being inclined inward. Fig. 2 represents a plan view of the same with the disks arranged parallel to the line of draft. Fig. 3 represents a plan view of the same with the disks inclined outward, and Fig. 4 is an enlarged detail view of one disk with its axle and clamp-nuts.

In the accompanying drawings, K designates the beam or draft-tongue of my cultivator, to which are rigidly attached rear guiding-handles L L and cross-bar N. Said cross-bar is provided near each end with a series of vertical apertures, *n*, which are adapted to receive the screw-threaded shanks $n^1$ of downwardly-extending bifurcated standards or bearings P. Said shanks receive nuts $n^2$, whereby they are firmly, though detachably, clamped to the cross-bar. Each bifurcated standard P serves as bearings for the journals of a screw-threaded short axle, Q, (shown in detail in Fig. 4,) on which is clamped a concavo-convex cutting-disk, R, by means of clamp-nuts *r*. This method of attachment allows the disks to be readily removed for cleansing or mending, but holds them firmly while in operation.

The cutting devices or disks are arranged, in accordance with the construction above described, at each end of the cross-bar, so as to straddle the row of plants. Their distance apart may be regulated by means of apertures *n*. Said disks may also be adjusted pivotally by loosening nuts $n^2$, turning shanks $n^1$ to the required position, and then clamping them again, whereby said disks R may be arranged to throw the earth inwardly or outwardly, or to cut straight forward, as in Figs. 1, 2, and 3. The concave side of said disks is preferably turned outward.

I also attach to the inside of each bifurcated standard P a scraping-blade or cleaner, *h*, which enters the hollow of its disk R and removes the soil accumulated in its rotation. Another scraper, *h'*, performs a similar office on the convex side of said disk, and is similarly attached to bifurcated standard or bearing P. These scrapers *h h'* preferably conform to the curvature of the said disks. One of them may be used without the other.

I also employ guards or scrapers *v*, arranged in front of the disks R, as shown. Said guards consist of strong wires or small steel bars bent into the shape shown. They are sufficiently strong to serve for pulling up and removing weeds and ordinary obstructions, but still are not too rigid to serve as springs.

The arrangement of the scrapers *h h'* is pendent or extending downward, so that the earth scraped from the disk will drop from said scrapers. The cutting-edge is presented rearwardly, for the purpose of more effectually clearing the disk.

The concavo-convex form of disk is found to do its work far more effectually than the old plain disk; but scrapers, as ordinarily constructed and arranged, are not adapted to be used with the former. Such adaptation, therefore, forms an important part of my invention, and accomplishes a very desirable and important result. The attachment of the scrapers to the supports for the disk insures the proper position of said scrapers when said disks are adjusted pivotally. The said scrapers are arranged so as to cut or shave the earth from the disks.

The nuts on the threaded axles operate to clamp the disks tightly in place, so as to compensate for any inequality resulting from wear or defective construction.

The references to the scrapers, while having a certain value as showing the state of the art, (for which purpose they were given,) do not answer our claims. The scrapers are not pendent; they do not cut or shave the earth; they are not adapted to concavo-convex cutting-disks, and the combinations claimed are clearly not shown.

The pin used in the Densmore case could not clamp the disk in case of any inequality in construction, and would be practically of little value. The nuts follow the disk along the axle, and compensate for even the slightest looseness.

By means of the threaded axles and nuts working thereon, the disks can be adjusted toward or from the scrapers *h*.

Having thus fully described my invention, what I claim as new, and desire to secure by Letters Patent, is—

1. In a cultivator, the combination of a concavo-convex cutting-disk with a pendent scraper which enters the concavity of said disk.

2. In a cultivator, the combination of a frame, pendent scrapers, axles, and concave cutting-disks with adjusting mechanism, whereby the lateral distance between the scrapers and disks can be either lessened or increased.

3. In a cultivator, the combination of a revolving concavo-convex disk with a support for said disk, having a pendent scraper attached thereto, and adapted to enter the concavity of said disk.

4. In a cultivator, the combination of a supporting-frame and a concavo-convex disk with a pendent clearing device, which presents a cutting-edge rearwardly for the purpose of shaving the earth from the disk.

5. In a cultivator, the combination of a revolving axle with a concavo-convex disk and clamping-nuts working on screw-threads, so as to follow said disk and tighten it in place.

6. The combination, in a cultivator, of a draft-frame with two revolving axles attached thereto, and having concavo-convex disks mounted on and firmly clamped to said axles by adjustable nuts.

7. In a cultivator, the combination of a draft-tongue, cross-bar, and revolving disks attached to said bar, said disks being adjustable toward or from each other, and arranged to straddle a row of plants and turn the earth either toward or from the row, as desired.

In testimony that I claim the foregoing as my own I affix my signature in presence of two witnesses.

MOSES JOHNSON. [L. S.]

Witnesses:

ALFRED H. ROWELL,
WILLIAM J. BULGER.